United States Patent [19]

Tsurumi et al.

[11] Patent Number: 4,956,331
[45] Date of Patent: Sep. 11, 1990

[54] PROCESS FOR PRODUCING METAL SUPPORTED CATALYST HAVING HIGH SURFACE AREA

[75] Inventors: Kazunori Tsurumi, Tokyo; Toshihide Nakamura, Funabashi; Akira Sato, Misato, all of Japan

[73] Assignee: Tanaka Kikinzoku Kogyo K.K., Japan

[21] Appl. No.: 312,702

[22] Filed: Feb. 17, 1989

[30] Foreign Application Priority Data

Feb. 18, 1988 [JP] Japan ................................ 63-36249

[51] Int. Cl.$^5$ ........................ B01J 21/18; B01J 23/42; B01J 23/44
[52] U.S. Cl. ..................................... 502/339; 502/185
[58] Field of Search ............... 502/185, 223, 262, 333, 502/334, 339

[56] References Cited

U.S. PATENT DOCUMENTS

| 3,271,327 | 9/1966 | McEvoy et al. | 502/339 |
| 4,024,079 | 5/1977 | Okuyama et al. | 502/216 |
| 4,499,205 | 2/1985 | Masuda | 502/333 X |

Primary Examiner—W. J. Shine
Attorney, Agent, or Firm—Klauber & Jackson

[57] ABSTRACT

Disclosed herein is a process for reducing metal salts in which catalyst metal containing ions are reduced to the corresponding metals with a reducing agent which contains a sulfur atom and is relatively weak in reducing ability such as sodium thiosulfate, potassium thiosulfate, ammonium thiosulfate, sodium metabisulfite, potassium metabisulfite and ammonium metabisulfite. Since the reducing agent is weak, the size of the catalyst metals supported on the supports is small to enhance the catalytic activity.

4 Claims, No Drawings

PROCESS FOR PRODUCING METAL SUPPORTED CATALYST HAVING HIGH SURFACE AREA

BACKGROUND OF THE INVENTION

This invention relates to a process for reducing metal containing ions which is employed for preparing a metal supported catalyst by supporting various kinds of catalyst metals onto inorganic supports.

Catalysts comprising inorganic oxide supports such as silica and alumina, and an individual noble metal such as platinum and palladium or the combination of the noble metals, supported thereon have heretofore been employed as those for various chemical reactions and for electrodes of fuel cells. Other catalysts comprising carbon supports and various kinds of catalyst metals such as platinum supported thereon have been also employed.

The catalyst performance of these catalysts depends on the degree of dispersion of the catalyst metals and the performance (specific activity) is promoted with the increase of the surface area of the catalyst if the same amount of the catalyst metals is supported thereon. In preparing the above catalysts, the metal elements are supported onto the inorganic supports by reducing ions containing the catalyst metals to be supported, to the metal elements by means of a reducing agent.

Since, however, such a reducing agent as lithium aluminum hydride and sodium borohydride ordinarily employed is too strong, the particle size of the metals produced by the reduction increases and the particle size distribution becomes broader. In other words, the conventional method has the drawbacks such that the number of the particles decreases to lower the surface area per unit volume of the metal so that the catalytic activity is also made to be lowered, and the particle size becomes considerable lack of uniformity.

Various kinds of alloy catalysts having high catalytic activity have been heretofore proposed after the investigation of the combinations of the supported metals (for example, U.S. Pat. No. 4,447,506).

However, even in these catalysts, the catalyst metals thereof are requested to have a small particle size, that is, a large specific surface area for elevating the activity. Moreover, the alloy catalysts are generally prepared by alloying an alloy component element with a noble metal already supported on the catalyst. It is important from this standpoint to prepare the catalyst supported with a high surface area noble metal having narrow particle size distribution, that is, a uniform particle size.

Having the uniform particle size is important to obtain an alloy catalyst having particles of equal alloy composition.

These catalysts have the drawback that they are likely to be exposed to a high temperature so that the activity may be lost with the lapse of time to shorten the catalyst life if they do not have the resistance to a sintering reaction.

SUMMARY OF THE INVENTION

Accordingly, it is an object of this invention to provide a process for reducing metal salts in which the corresponding metal elements which have a high durability against a sintering reaction can be supported at high degree of dispersion on inorganic supports by employing a sulfur containing reducing agent which is weak in reduction ability, when the catalyst metals are made to be supported onto the inorganic supports.

In accordance with one aspect of this invention, there is provided a process for reducing metal salts comprising: reducing the solution of a metal containing ion or ions, or the mixture of the solution of the metal containing ion or ions to the corresponding metal or metals employing one or more reducing agents selected from the group consisting of sodium thiosulfate, potassium thiosulfate, ammonium thiosulfate, sodium metabisulfite, potassium metabisulfite and ammonium metabisulfite; and supporting the reduced metal or metals having a large surface area onto supports.

The most characteristic feature of this invention is in that, when the ion or ions which contain the catalyst metals, for example, an chloroplatinic ion are reduced to support the catalyst metals onto carbon supports or inorganic oxide supports such as silica and alumina, one or more sulfur containing reducing agents which are relatively weak in reducing ability are employed.

DETAILED DESCRIPTION OF THE INVENTION

As the inorganic supports of this invention, the carbon supports of which a main component is a carbon element having any form such as carbon black, graphite and activated carbon; and the fire resistant inorganic oxide supports such as silica and alumina may be employed.

Since these inorganic supports are utilized for catalyst supports, they are preferably fine particles having a large surface area, for instance, of 30 to 2000 m$^2$/g and desirably have a particle size of 100 to 5000 Å. As the carbon supports, for example, commercially available Acetylene Black (trade name, Shawinigan Acetylene Black and Denka Acetylene Black), electroconductive carbon black (trade name: Vulcan XC-72R) and graphitized carbon black may be employed.

Such a noble metal as platinum and palladium can be preferably employed as the metals to be supported onto the inorganic supports of this invention, and the other metals may be also employed. The ions containing these metals include the said individual metal ions; and the complex ions of these metals such as a chloroplatinic ion and a palladium chloride ion.

Reduction of the metal containing ion will be described taking the chloroplatinic ion as an example.

The way of supporting the platinum metal itself can be carried out according to any conventional method. One of the conventional methods comprises mixing the carbon supports or the inorganic oxide supports with the chloroplatinic acid aqueous solution, reducing the chloroplatinic acid ion and supporting the reduced platinum metal onto the supports; and another comprises, prior to the mixing with the supports, reducing the chloroplatinic acid and supporting the reduced platinum onto the supports.

However, if a strong reducing agent is employed in these reactions for reduction, the size of platinum particles increases so that the surface area of the particles per unit weight considerably decreases. For this reason, such a weak reducing agent as sodium thiosulfate ($Na_2S_2O_3 \cdot 5H_2O$), potassium thiosulfate, ammonium thiosulfate or the like is employed to depress the decrease of the surface area of the platinum.

The sodium thiosulfate, the potassium thiosulfate, the ammonium thiosulfate or the like reacts with the platinum containing ion in the aqueous solution, that is, the chloroplatinic ion to form finely divided metal sol having a large surface area.

It seems that, in this reaction employing the sodium thiosulfate, much finely divided sulfur sol may be formed by decomposition of a sulfur compound according to the following equation, which is known to occur in an acidic solution.

$$S^{2-} + 2H^+ \rightarrow H_2S_2O_3 \rightarrow S + H_2SO_3$$

The sulfur particles thus obtained serve as nuclei for growing much finely divided metal catalyst particles. Accordingly, it is preferable to slowly add, that is, add dropwise the initial several milliliters of the solution of the thiosulfate salt and then add the rest of the solution all at once for assuredly forming the nuclei for growing.

With the progress of the reaction, the solution turns from yellow to orange, and with the further growth of the metal fine crystals for several hours, the solution gradually becomes darker. Light passing through the solution exhibits the Tyndall effect showing the existence of colloidal particles.

This sol is then adsorbed onto the carbon supports or the inorganic oxide supports to provide the inorganic supports supported with the platinum through appropriate procedures such as drying.

In other words, when the solution becomes nearly opaque, the carbon supports and the like are added into the solution and then the liquid phase of the formed slurry is forced to penetrate into the pores of the inorganic supports by agitation employing for example a supersonic agitator. The thicker slurry is formed by this procedure, which remains suspended and seldom precipitates.

Different from the above procedures, after the chloroplatinic acid solution is added to the supports to prepare the slurry and the formed slurry is well agitated and dispersed, for example, with a supersonic agitator, a small amount of the thiosulfate salt aqueous solution may be initially added gradually and the rest of the solution may be added at once to reduce the platinum containing ion to platinum under the existence of the supports and to support the platinum thereon. Drying of thus obtained slurry e.g. at 75° to 80° C. for one to three days for removing water provides dried powders containing the salt of a reaction byproduct. The byproduct may be dissolved and removed by extracting the dried powders several times with for instance 100 to 200 ml of distilled water. In the case of the graphitized carbon black supports, the said slurry precipitates and can be separated from the aqueous phase by discharging the aqueous phase. After the procedure is repeated several times, the catalyst is dried overnight at about 110° C. The catalyst thus obtained has a large surface area and its particle size is uniform.

In place of the above procedures, slurrying-filtration-washing process can be utilized. This process can be used in the case of acetylene black or the like which does not easily precipitate.

For example, according to the process, an aqueous solution of 1 g/100 ml of chloroplatinic acid is reacted with an aqueous solution of 1 g/25 ml of sodium thiosulfate (penta hydrate salt) to produce a catalyst supported with platinum of which a specific surface area is 148 m²/g and of which a particle size is uniform.

Since the thermodynamic driving force of the reaction between the chloroplatinic ion and the thiosulfate ion is smaller than that of the conventional art and fine crystal particles with less defects can be produced, the catalyst particles produced in this process is considered to have larger durability against a sintering reaction in which the surface area of platinum decreases with time. The fine particles having a uniform particle size of not more than 20 Å can be obtained by the above mentioned reaction between the thiosulfate and the chloroplatinic acid.

The relatively weak reducing agents which can be employed in the process of the present invention other than the above mentioned sodium thiosulfate include sodium metabisulfite ($Na_2S_2O_5$), its potassium salt and its ammonium salt. These salts seem to reduce a metal containing ion through a similar mechanism.

The excellent dispersion of the catalyst particles can be obtained both in the process in which the platinum containing ion is reduced prior to the impregnation of the platinum containing solution into the carbon supports and in the other process, contrary to the above process, in which the platinum containing ion is reduced after the impregnation.

In place of supporting one kind of metal such as platinum or palladium, a solution containing the both metal containing ions can be employed so that the two metals can be supported at the same time.

In the above process, it may be possible to support only one metal to be alloyed with another metal.

It is possible, when the carbon supports are employed as the inorganic supports, to depress the decrease of the surface area due to movement and agglomeration of the supported metals, when employed at a high temperature, by carburizing the supported metals of the carbon supports formed to enhance the affinity between the carbon supports and the supported metals.

In the present invention, the ions containing the catalyst metals are reduced with such a sulfur containing and relatively weak reducing agent as sodium thiosulfate, potassium thiosulfate, ammonium thiosulfate, sodium metabisulfite, potassium metabisulfite and ammonium metabisulfite when one or more of the catalyst metals including, for example, platinum are supported onto the carbon supports or the inorganic oxide supports.

Thereby, the particle size of the deposited metals decreases and becomes uniform compared with that when such a strong reducing agent as sodium borohydride is employed. This tendency becomes much more remarkable because the metal particles grow around the sulfur atoms liberated during the reduction process, which serve as nuclei.

It is possible to effectively utilize the catalyst metals because the catalyst metals formed on the inorganic supports and having a large surface area can be sufficiently in contact with a reactant to promote the specific catalytic activity.

Further the catalyst metals formed according to the present invention are considered to have large durability against a sintering reaction which is expected to lower the surface area of the catalyst metals with time because the thermodynamic driving force of the reaction between the metal containing ion and the sulfur containing reducing agent is smaller than that of the prior art, to form the fine crystal particles with less defects.

When a second metal and a third metal are further supported onto the noble metal supported catalyst and are alloyed therewith, the composition of the particles after the alloying becomes nearly uniform so that the desired composition can be attained for the individual particles because the particle size of the noble metal produced in the process of this invention is uniform.

The present invention will now be described in detail in connection with the following Examples. However, these Examples are not intended to limit the scope of the present invention.

EXAMPLE 1

3 g of chloroplatinic acid was dissolved in 300 ml of water in a vessel of which a volume was 0.5 l. 10 ml out of 75 ml of water in which 3 g of $Na_2S_2O_3.5H_2O$ was dissolved was added dropwise into the above solution for 3 minutes and the rest of 65 ml was added all at once, and the solution was stirred at 27° C. With the lapse of time, the mixed solution became from yellow to orange, further to dark orange.

After the lapse of 3 hours, the room was darkened and the light of an electric bulb was applied to the vessel, then the scatter of the light was observed. The slurry in which 10 g of Acetylene Black for the catalyst supports was suspended in 100 ml of pure water was added to the above mixed solution. The slurry was stirred for two minutes with a supersonic agitator so that the mixed solution was forced to penetrate into the pores of the supports. The slurry was kept to be suspended and did not precipitate during the stirring operation.

The slurry was dried in an oven at 75° to 80° C. overnight for removing water. The dry powders thus obtained were washed three times with about 200 ml of distilled water so that the byproducts were extracted and removed. After this slurry was allowed to stand, the supernatant solution was discharged. The slurry was further dried overnight at 70° C. to obtain the carbon supports supported with the platinum.

The average platinum size of the platinum-carbon catalyst thus obtained was 18 Å, and the particle size of the platinum particles was found to be nearly uniform by observing the catalyst with a transmission type electron microscope. The specific surface area of the platinum was 155 $m^2/g$, and the supported platinum was 10 weight % according to an electrochemical hydrogen adsorption-desorption method.

COMPARATIVE EXAMPLE 1

Platinum was supported on the carbon supports by the same procedures as those of Example 1 except that $Na_2BH_4$ was employed instead of $Na_2S_2O_3.5H_2O$. The average platinum size of the platinum-carbon catalyst thus obtained was 48 Å, and the platinum particles had the broad particle distribution of 20 to 100 Å according to observation with an electron microscope. The specific surface area of the platinum was 56 $m^2/g$, and the supported platinum was 10 weight %.

EXAMPLE 2

Platinum was supported on the carbon supports by the same procedures as those of Example 1 except that sodium metabisulfite ($Na_2S_2O_5$) was employed instead of $Na_2S_2O_3.5H_2O$.

The average platinum size of the platinum-carbon supports catalyst thus obtained was 20 Å, and the specific surface area was 141 $m^2/g$, and the supported platinum was 10 weight %. The platinum particles were found to be nearly uniform by observing the catalyst with an electron microscope.

EXAMPLE 3

3 g of chloroplatinic acid was dissolved in 300 ml of water in a vessel of which a volume was about 1 l. To this solution was added 10 g of graphitized carbon black which had been prepared by thermally treating electroconductive carbon black at 2700° C., and the suspension was stirred for two minutes with a supersonic agitator. Thereafter, about 10 ml out of 75 ml of pure water in which 3 g of sodium thiosulfate penta hydrate salt ($Na_2S_2O_3.5H_2O$) was dissolved was added dropwise into the above solution for 2 minutes with supersonic stirring and the rest of 65 ml was added all at once, and another one minute's supersonic stirring was continued. After the slow stirring at a fixed temperature of 45° C. was continued for three hours, the slurry was filtrated by suction and washed with pure water. The obtained cake-like material was dried overnight at 70° C. to obtain the carbon supports supported with the platinum.

The average platinum size of the platinum-carbon catalyst thus obtained was 19 Å, and the particle size of the platinum particles was found to be nearly uniform by observing the catalyst with a transmission type electron microscope. The specific surface area of the platinum was 148 $m^2/g$, and the supported platinum was 10 weight %.

EXAMPLE 4

Palladium was supported onto the carbon supports by the same procedures as those of Example 1 except that 300 ml of an aqueous solution which had been prepared by dissolving 1.9 g of palladium chloride dissolved in a small amount of hydrochloric acid in pure water was employed in place of the chloroplatinic acid solution of Example 1 and that 40 ml of an aqueous solution in which 1.5 g of the sodium thiosulfate penta hydrate salt was employed.

The average palladium size of the palladium-carbon supports catalyst thus obtained was 18 Å, and the particle size of the palladium particles was found to be nearly uniform by observing the catalyst with an electron microscope. The specific surface area of the palladium was 277 $m^2/g$, and the supported palladium was 10 weight % according to a CO adsorption method.

EXAMPLE 5

Platinum was supported onto alumina supports by the same procedures as those of Example 3 except that γ-alumina powders for catalyst supports were employed in place of the graphitized carbon black of Example 3 and that the drying after the washing was performed at 120° C.

The average platinum size of the platinum-alumina supports catalyst thus obtained was 17 Å. The specific surface area of the platinum was 165 $m^2/g$, and the supported platinum was 10 weight % according to a CO adsorption method.

EXAMPLE 6

To 300 ml of an aqueous solution which had been prepared by mixing chloroplatinic acid containing 0.38 g of platinum and palladium chloride containing 0.75 g of palladium dissolved in a small amount of hydrochloric acid and pure water was added electroconductive carbon black (trade name: XC-72R). After the suspension was stirred for two minutes with a supersonic agitator, about 10 ml out of 50 ml of pure water in which 2 g of sodium thiosulfate penta hydrate salt ($Na_2S_2O_3.5$-

$H_2O$) was added dropwise for two minutes under supersonic agitation. The rest of 40 ml was added all at once and the supersonic agitation was further continued for one minute. After the slurry thus obtained was dried overnight in an oven at 75° to 80° C., it was washed with about 200 ml of pure water so that the byproduct was extracted and removed. This slurry was further dried overnight at 70° C. so that the carbon supports supported with the platinum and the palladium was obtained.

The supported metal particle size of the platinum-palladium carbon supports catalyst thus obtained was about 16 Å, and the particles were uniform according to the observation with an electron microscope.

While the invention has been particularly set forth in terms of specific embodiments thereof, it will be understood in view of the instant disclosure, that numerous variations upon the invention are now enabled to those skilled in the art, which variation yet reside within the scope of the present teaching. Accordingly, the invention is to be broadly construed, and limited only by the scope and spirit of the claims appended hereto.

What is claimed is:

1. A process for producing a metal supported catalyst having a large surface area comprising:
   reducing one or more metal containing ions in a solution to a corresponding metal or metals employing a solution of one or more reducing agents selected from the group consisting of sodium thiosulfate, potassium thiosulfate, ammonium thiosulfate, sodium metabisulfite, potassium metabisulfite and ammonium metabisulfite; the solution of reducing agent being initially added dropwise and all at once thereafter to assure the formation of nuclei for forming finely-divided catalyst particles; and
   supporting the reduced metal or metals having a large surface area onto supports.

2. A process as defined in claim 1, wherein the supports are carbon supports.

3. A process as defined in claim 1, wherein the supports are inorganic oxide supports.

4. A process as defined in claim 1, wherein the metal or metals contained in the metal containing ions are platinum and/or palladium.

* * * * *